Aug. 1, 1967 R. E. SWIFT 3,334,183
TELETYPEWRITER RECEIVER FOR RECEIVING DATA
ASYNCHRONOUSLY OVER PLURALITY OF LINES
Filed Oct. 24, 1963 3 Sheets-Sheet 1

INVENTOR
R. E. SWIFT
BY
ATTORNEY

United States Patent Office 3,334,183

Patented Aug. 1, 1967

3,334,183

TELETYPEWRITER RECEIVER FOR RECEIVING DATA ASYNCHRONOUSLY OVER PLURALITY OF LINES

Roger E. Swift, Fair Haven, N.J., assignor to Bell Telephone Laboratories, Incorporated, New York, N.Y., a corporation of New York

Filed Oct. 24, 1963, Ser. No. 318,762

12 Claims. (Cl. 178—88)

ABSTRACT OF THE DISCLOSURE

Storage and retransmission of asynchronous pulse data, conveyed by a plurality of transmission lines, necessitates that the data be intelligibly sampled. Data pulses appearing on the transmission lines, in coincidence with addressing scan pulses, initiate a pulse train in a single delay network utilized to develop the proper sequence of sampling signals. By relating the delay time of the network to the addressing scan period, the generated sampling pulses are properly related to the data message signals.

This invention pertains to pulse transmission systems. More particularly, it deals with the generation of sampling pulses for use in the storage and retrieval of asynchronous teletypewriter information.

In a large and extensive teletypewriter communication system, it is economical to service numerous subscribers wishing their data to be transmitted, e.g., across the continent, with a relatively few cross continental transmission lines. At times of heavy traffic over these transmission lines, means must be provided for the storage and retransmission, at opportune times, of the signals received over the numerous individual subscriber lines. The storage of subscriber data presents difficulties, however, which will be readily apprehended after a consideration of a typical teletypewriter code format.

Teletypewriter information is transmitted by a sequence of pulses, binary in nature, where one voltage or current level is referred to as a "mark" and the other as a "space." Typically, five intelligence pulses are transmitted in sequence to represent a letter of the alphabet. To this train of pulses are added two synchronizing pulses, known as "start" and "stop" pulses, which precede and follow, respectively, the five intelligence pulses. In a well-known code format, the "start" pulse is of the same length as an intelligence pulse, typically 22 milliseconds for a 60 word per minute (w.p.m.) code, while the "stop" pulse is 1.42 times as long. This code is referred to as "7.42 unit Baudot," a descriptive title related to the code's total length.

The intelligible reception of such a code format necessarily requires a determination of the binary energy state of a received pulse and a determination as to which pulse is being received. This second determination is facilitated by the fixed time intervals assigned to intelligence pulses in a teletypewriter code. After receipt of a synchronizing "start" pulse it is thus necessary to sample the message only at predetermined time intervals, coordinated with the known positions of the message pulses on the time scale. When storing teletypewriter data, the same sampling procedure is required if the data is to be intelligibly retrieved from storage.

This procedure is somewhat akin, by analogy, to the procedure by which a listener records a selection of an operatic work on a tape recorder from a radio broadcast. The listener waits for the closing word, a "start" signal, of the announcer and then starts his recording. If this synchronization of recording and "start" signal did not occur, his recording would not be a reproduction of all intelligence transmitted, namely, the opening notes of the overture. The analogy may be further extended to the perplexing problem of recording 256 radio broadcasts of operatic works on 256 tape recorders, not knowing at what time the different broadcasts are to commence and wishing only to record selections of music at fixed time intervals after the commencement of a work. Obviously, such an attempted recording will be impossible unless numerous listeners are available to monitor each broadcast individually.

This problem is similar to the reception and storage of teletypewriter data received on a plurality of subscriber lines. "Start" pulses must be detected for each data message in each line and provision made for sampling each message at fixed time intervals. Devices of the prior art solve this problem by incorporating detection and timing apparatus on a per line basis. Each subscriber line is thus treated individually to the exclusion of the numerous other lines. This technique, when used with a multiplicity of input lines, is uneconomical, inefficient and redundant.

It is an object of the present invention to generate sampling pulses for data signals, transmitted on a plurality of lines, in a manner which overcomes the shortcomings of prior art devices.

Another object is to generate sampling pulses for data signals asynchronously related to each other and conveyed by a plurality of individual lines.

A further object of this invention is to provide sampling pulses for data signals on lines carrying different code formats of teletypewriter data.

In accordance with the present invention, each input data line, connected to a remote station, terminates in a storage area and is connected, by a corresponding bridging line to an individual receiver. In operation the lines are sequentially addressed, i.e., the several receivers are sequentially enabled, to receive data signals. If a "start" signal is present in one of the addressed lines, e.g., is detected at one of the enabled receivers, a signal is transmitted to a delay network. This signal propagates through the network and in doing so generates timing signals, at tapped intervals of the network, which are integrally related to the time necessary to address all of the input lines. These timing signals are used to generate sampling pulses for the teletypewriter message. The operations for one line are carried out for all lines. As each energized line is addressed, its receiver transmits a signal to the same delay network. Thus, in accordance with the invention, one delay network serves all incoming data lines and all receivers. The signal propagates through the network producing timing signals. Timing signals for one line are distinguished from those for another, in accordance with the invention, by means of the integral relationship between the time necessary to address all the lines and the time intervals established by the taps on the delay network. Accordingly, as a timing signal leaves the network, it will be in time coincidence with an addressing signal for only one of the lines. By properly choosing the integral relationship between the timing signals and the addressing signals, each data message is individually sampled in the correct manner.

In one embodiment of the present invention, "start" pulses, which appear on each of a plurality of input lines, when in time coincidence with addressing pulses, initiate a pulse train in a delay network. The network provides a sequence of timing pulses, which are used to generate sampling pulses. These sampling pulses make possible the storage of a data message in an orderly manner agreeing with the order and position of the message pulses at a remote transmitter station. All data later retrieved from the store is thus an exact replica of a message generated at a remote station. In addition, an addressing means is provided for sequentially enabling each receiver connected to each of the plurality of input lines. Since a receiver is associated with each line, the terminology "addressing a line" will be used when convenient. The time necessary to address all of the lines is referred to as the "scanning period."

By means of the features of the invention, one delay network thus serves a multiplicity of lines carrying the same code format. The coincidence of an assigned addressing signal and a "start" pulse at a line receiver enables the receiver to initiate a pulse in the delay network. As other energized lines are individually addressed, their respective receivers also initiate pulses in the delay network causing a train of pulses to propagate through the network. The delay network segmented into electrical lengths corresponding to integral multiples of the scanning period produces timing pulses intimately related to only one of the many input lines. If various code formats are to be serviced, one delay network is assigned to each group of lines carrying the same format.

The present invention thus makes possible, in a novel and efficient manner, the storage and retrieval of asynchronous data of different code formats from a plurality of sources.

Other objects and features, the nature of the present invention and its numerous advantages, will appear more fully upon consideration of the attached drawings and of the following detailed description of these drawings.

Figure 1:
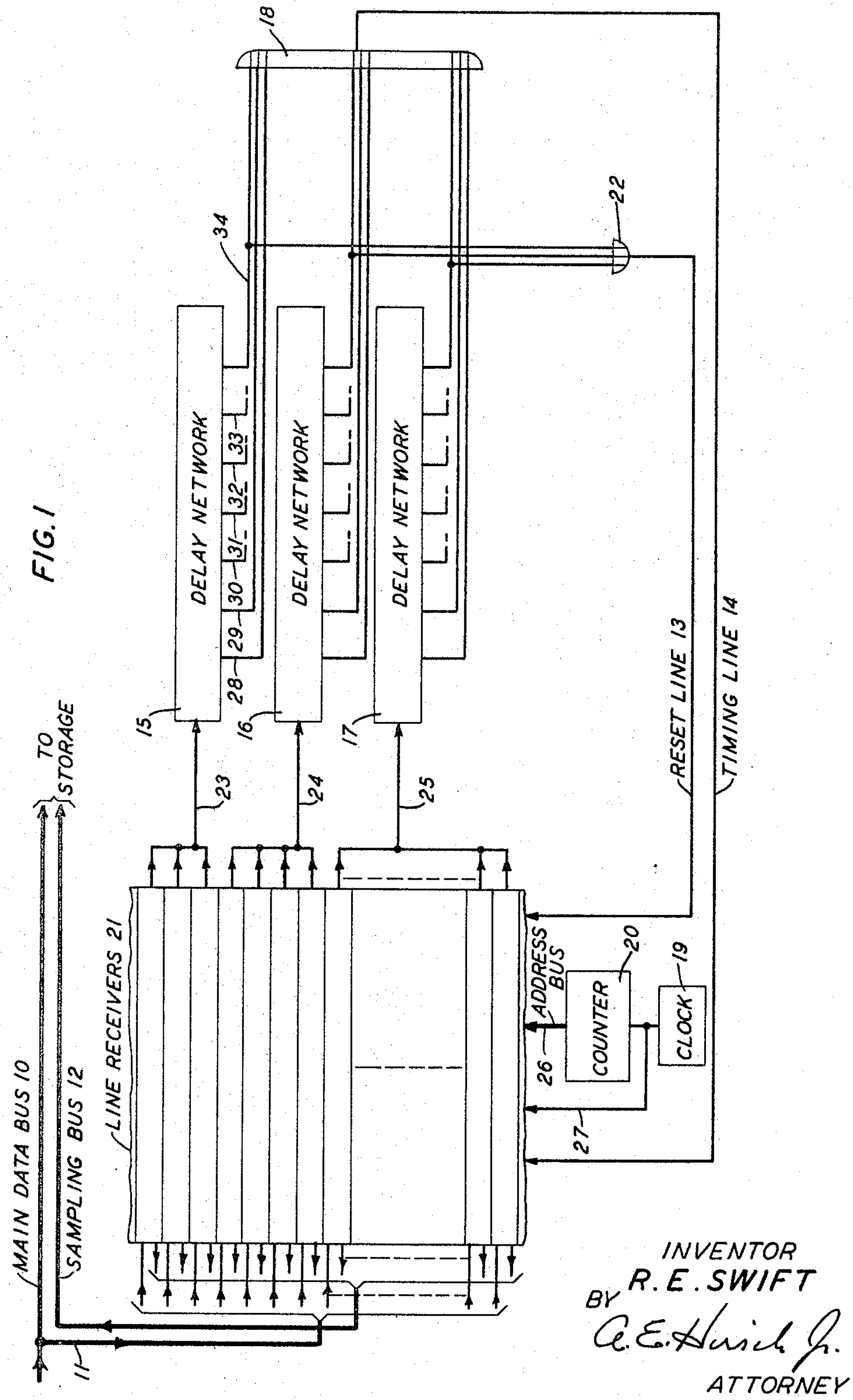
FIG. 1 is a schematic block diagram of a preferred embodiment of the present invention.

There is shown in FIG. 1 a block diagram of a system for providing sampling pulses in accordance with the present invention. A main data bus 10 containing a plurality of teletypewriter lines terminates in a storage area, not shown in the drawing. For each line in the main bus, a corresponding bridging line is connected to one of a plurality of line receivers 21. A clock 19 and counter 20 produce the addressing signals which sequentially enable each of the receivers. Assuming that a "start pulse" exists on one of the input lines, a signal will be transmitted to a delay network, e.g., 15, assigned to the group of receivers which receive the same code format. The signal propagates through the network producing timing signals which are conveyed back to the receivers by a timing line 14 common to all receivers. Provision is made for an individual receiver to respond only to specific timing signals. This receiver then produces sampling signals on one of the plurality of lines of the sampling bus 12. Since each line in the sampling bus is associated with a data line in the main bus, these sampling signals make possible the intelligible storage of the data signals. When a pulse after propagating through the delay network reaches the end of the network, a signal is transmitted by a reset line 13 to reset the receiver to repeat the same operation upon the receipt of another "start" pulse.

More particularly, data bus 11, which bridges the main data bus 10 and contains a plurality of input lines, e.g., 256 lines, conveys "start" signals to the receivers represented by block 21. To facilitate this application, the term "bus" will be used to denote a cable containing more than one conductor. Each individual receiver in block 21 is thus supplied by one input line and a corresponding sampling line of bus 12. Sampling bus 12, containing a sampling line for each input line, accompanies the main data bus to a storage area of conventional construction. Common to all receivers are the eight-line address bus 26, a reset line 13, a timing line 14 and a clock line 27. A start line 23, 24 or 25 is connected to a group of receivers receiving the same code format. If only one code format is to be used, e.g., 60 w.p.m., 7.42 unit Baudot, only one start line and one delay network are required. If, however, groups of lines are to carry different code formats, a delay network, 15, 16 or 17, is connected by a start line to the group of receivers assigned to lines receiving only the specified code format. Each delay network has output lines 28, 29 . . . 34, which are connected to conventional OR circuit 18. The last output line of each delay network, e.g., 34, is connected to conventional OR circuit 22. OR circuits 18 and 22, in a well-known manner, serve to permit a number of pulse sources to be connected to a common load.

A conventional clock 19 for producing pulses at a predetermined rate, provides a train of pulses to counter 20. For the illustrative example of 256 input lines, the counter may consist of eight cascaded bistable multivibrators. The counter is thus capable of producing 256 individual signals. Eight lines, one from each multivibrator are connected in common to the line receivers of block 21 by bus 26. Since there are eight binary stages, 256 different signal combinations may exist on the lines of bus 26.

In the system illustrated, clock 19 drives counter 20 which produces sequentially 256 different addressing signals. It will be assumed that all 256 input lines are carrying the same code format so that only one delay network, i.e., 15, is necessary. If, however, several code formats are to be received, a group of receivers receiving the same code, illustratively, the first three in FIG. 1, are connected in common to the same start line. It is readily apparent from FIG. 1 how the remaining receivers may be associated with their respective start lines and delay networks. It must be understood that, in general, with a number of delay networks used, the operation is the same as that to be described for one code format.

The coincidence of the assigned addressing signal and a "start" pulse at a receiver produces a pulse on start line 23 which travels through delay network 15. The pulse is tapped off at selected portions of the delay network on lines 28, 29 . . . 34 each of which is connected to OR circuit 18. The pulse propagated through the network thus generates a series of timing pulses on line 14 in time coincidence with the data pulses on the input line. Simultaneously, other pulses initiated by the coincidence of an addressing signal and a "start" pulse on other lines propagate through the delay network, following the pulse described above, producing timing pulses. The timing pulses produced are in time coincidence with addressing signals for the one line which initiated the propagating pulse in the network. This unique coincidence makes possible the generation of sampling pulses for the correct data message. The coincidence referred to is a direct result of the integral relationship existing between the addressing scan period and the time proportionate to the selected intervals of the network. This accomplishment is made clear in FIG. 2.

Figures 2, 4:
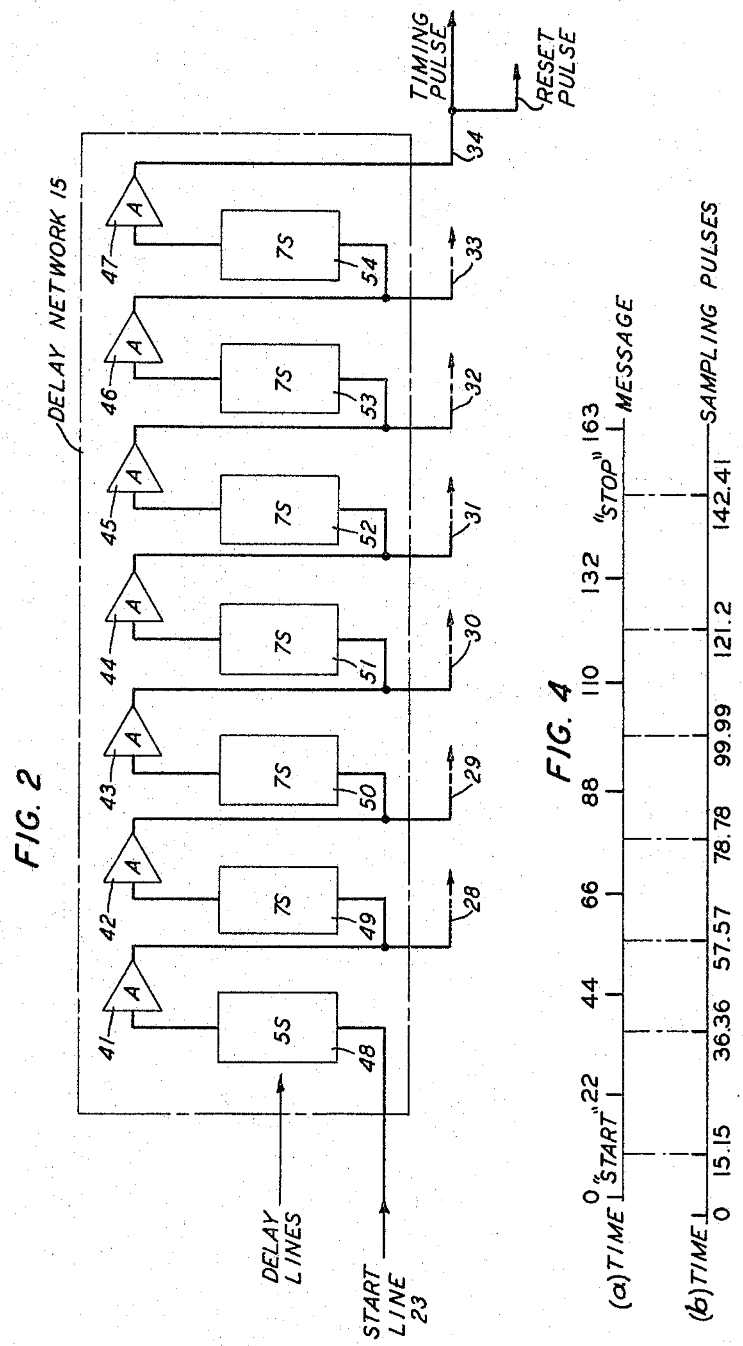
FIG. 2 is a more detailed diagram of one of the delay networks illustrated in block form in FIG. 1.
FIG. 4 is a timing diagram for a 60 word per minute 7.42 unit Baudot code format.

FIG. 2 displays the construction of a typical delay network. Start signals from the receivers of FIG. 1 enter the network via line 23 and exit via line 34. The network may, for example, consist of seven delay lines 48, 49 . . . 54, corresponding to the number of pulses in a code format tandemly connected to corresponding amplifiers 41, 42 . . . 47. The delay lines may be magnetostrictive or of other known design. The amplifiers are of conventional type and may be employed, to overcome insertion losses and pulse disfiguration, when necessary. The delay line lengths are chosen to be integral multiples of the addressing scan period, e.g., 5S (5×SCAN period), 7S, etc., as shown. As pulses leave the several delay lines, they provide timing pulses on lines 28, 29 . . . 34 intimately related to the data message initiating the pulses.

Figure 3:
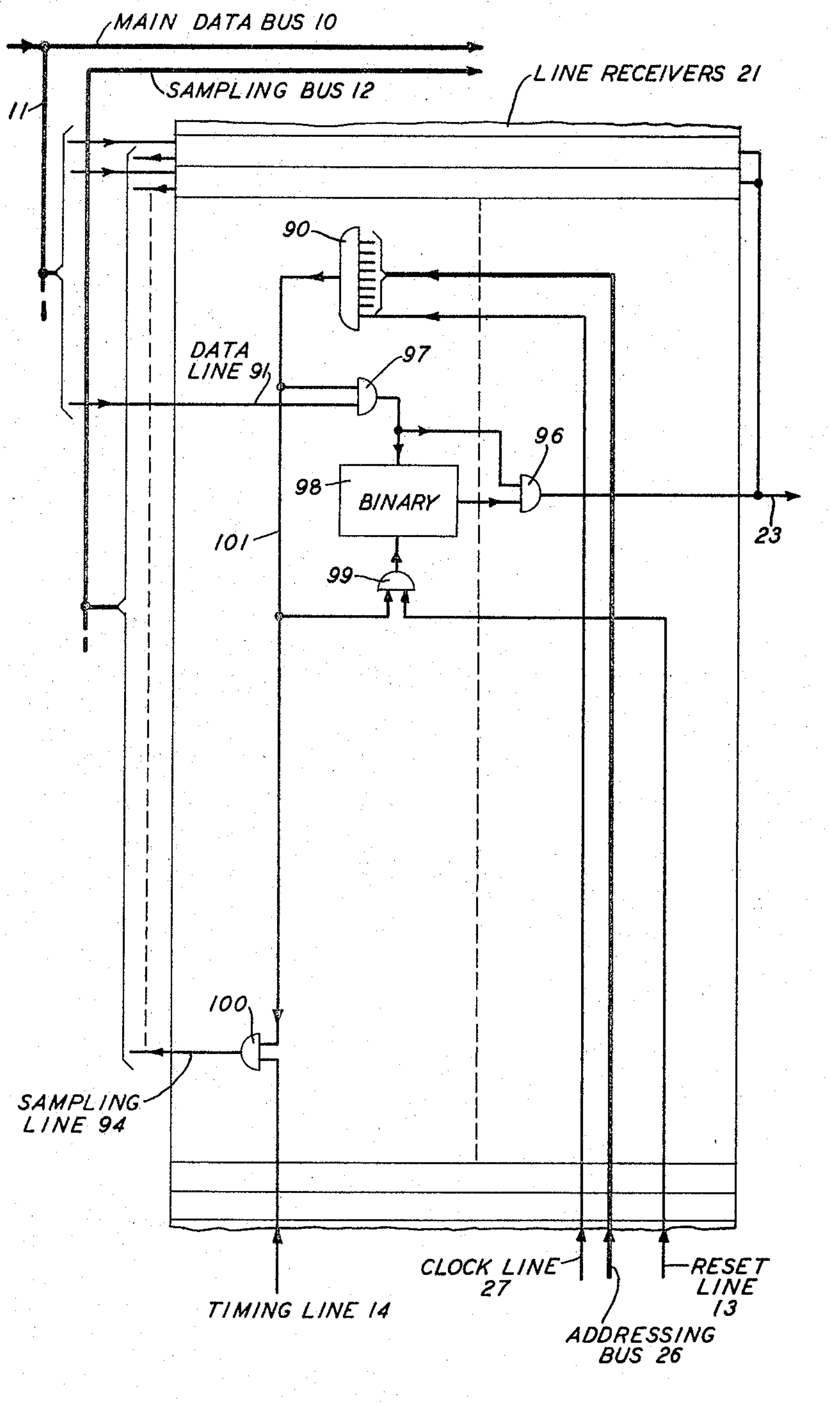
FIG. 3 is a detailed diagram of one of the line receivers of FIG. 1.

FIG. 3 is a diagram of an individual receiver. Data is supplied to a receiver by one data line of the data bus of FIG. 1. When a receiver is addressed by the signal assigned to it, a "start" pulse on the data line initiates a sequence of operations which result in a pulse being transmitted to a delay network. As the pulse propagates through the network, timing signals are produced which are conveyed back to the block of receivers. At only one receiver does a coincidence of the specified timing signals and addressing signals occur. This coincidence of timing pulses and addressing signals at a receiver is used to produce sampling pulses for the data message.

Specific reference to FIG. 3 shows an eight-line address bus 26 and a clock line 27, common to all receivers, which terminate in AND circuit 90. AND circuit 90 is arranged in a well-known manner so that only the coincidence of a clock pulse and one of the 256 different addressing signals will produce a pulse on line 101. This pulse on line 101, when in coincidence with a "start" pulse on data line 91 at AND circuit 97, triggers a binary multivibrator 98. The binary switching time is so adjusted that a start signal will occur on line 23 from AND circuit 96, responsive to the output of AND circuit 97 and binary 98, before the switching is complete. AND circuit 96 is then disabled upon completion of the switching until binary 98 is reset at the end of a message. The pulse on line 23 enters the delay network of FIG. 2 and, after a delay of some integral multiple of the addressing scan period, a pulse appears on timing line 14 (FIG. 1) which necessarily is in coincidence, at AND circuit 100, with an addressing pulse on line 101 because of the integral relationship between the addressing scan period and the timing pulses. This coincidence of pulses produces the proper sampling pulse on line 94 of sampling bus 12.

This operation continues sequentially until the timing pulse reaches the end of the delay network at which time a pulse appears on reset line 13 coincident with an addressing pulse at AND circuit 99 therefore enabling AND circuit 99 which resets binary 98 in preparation for the next message. This procedure occurs sequentially and concurrently for all the incoming lines carrying a message; a train of pulses is propagating through the delay network producing timing signals, and consequently sampling signals, in coincidence only with the message signals that initiated them.

FIG. 4 is a timing diagram for a 60 w.p.m., 7.42 unit Baudot code format. Line *a* represents the time format of the code. The numerals 22, 44, 66, etc., refer to the time interval, in milliseconds, of a message pulse. Line *b* represents the position of sampling pulses on the same time scale. It is advantageous to have a sampling pulse occur approximately in the center of its respective message pulse. Since the maximum error in detecting a "start" signal is equal to the scan period, it is also advantageous to have a short scan period. A scan period, such as 3.03 milliseconds, is thus chosen. The scan period, being the time required to address all 256 lines, necessitates a clock frequency equal to the product of the number of lines and the scan frequency, i.e., 84.48 kilocycles per second. The delay line lengths are chosen to produce a sampling pulse approximately at the center of each information pulse. The first delay line of length 5S (5×3.03) produces a pulse at 15.15 milliseconds. The positions of the other sampling pulses are readily apparent upon reference to the diagram. For different code formats the number and lengths of the individual delay lines are varied to position properly the sampling pulses.

It can be seen that a system for providing sampling pulses such as that disclosed in block form in FIG. 1 and implemented in FIGS. 2 through 4 may be used to store reproducibly asynchronous teletypewriter data received on a plurality of lines. In accordance with the invention, each of the input messages initiates a pulse in a common delay network suitably constructed to provide timing pulses and consequently sampling pulses coincident with the information pulses. Provision has also been made, in this invention, for processing data on lines of different code formats.

It is to be understood that the embodiments shown and described herein are illustrative and that further modifications of this invention may be contemplated by those skilled in the art without departing from the spirit and scope of the invention.

What is claimed is:

1. A data system for a plurality of lines, each conveying data signals asynchronously related, comprising means for sequentially addressing said lines with individual signals, receiver means responsive to said data signals and said addressing signals for producing start indications, and delay means responsive to said receiver start indications for generating timing signals at time intervals integrally related to the period of said addressing signals and intelligibly related to said data signals.

2. A data system according to claim 1 wherein said receiver means generates data sampling signals, and wherein said receiver means is jointly responsive to said addressing signals and to said timing signals generated by said delay means.

3. A data system according to claim 1 wherein said receiver means comprises, in combination, a first coincidence circuit responsive to said addressing signals, a bistable device, a second coincidence circuit responsive to the state of said first coincidence circuit and said data signals for switching said bistable device from its first stable state to its second stable state, a third coincidence circuit in circuit relation with said bistable device and said second coincidence circuit for initiating a signal in said delay means, a fourth coincidence circuit responsive to the state of said first coincidence circuit and a timing signal of said delay means for switching said bistable device from its second stable state to its first stable state, and a fifth coincidence circuit responsive to the state of said first coincidence circuit and said timing signals from said delay means for generating sampling pulses intelligibly related to said data.

4. A data system according to claim 1 wherein said delay means comprises a wave propagation device having an input terminal and several selectively spaced output terminals, said output terminals being separated by delay intervals that are proportionate to integral multiples of the addressing scan period.

5. A data system according to claim 1 wherein multiple delays means are used for multiple code formats of pulse data.

6. A data system according to claim 1 wherein said receiver means generates sampling pulses for the duration of a data message.

7. A data system for a plurality of lines each conveying data signals asynchronously related comprising, a plurality of receivers each connected respectively to one of said lines, addressing means for producing individual enabling signals for each of said receivers, said receivers jointly responsive to the coincidence of a data signal on said connected line and an enabling signal for producing start indications, and delay means responsive to said receiver start indications for generating timing signals at time intervals integrally related to the repetition rate of said addressing means, wherein said receivers generate data sampling signals responsive to the coincidence of said timing signals and said enabling signals for the intelligible storage of said data.

8. A data system according to claim 7 wherein the addressing means produces a plurality of enabling signals individually identified with the said plurality of lines.

9. A data system according to claim 7 wherein said delay means comprises several individual cascaded delay lines corresponding to the number of information pulses in the code format of said data signals and of a length whose delay is proportionate to the repetition rate of said addressing means.

10. A data system according to claim 9 wherein said individual delay lines are of a length proportioned to produce a pulse approximately at the center of an information pulse on the time scale.

11. A data system supplied with a plurality of lines each conveying pulse data comprising, means for sequentially detecting input data indications in each of said lines, delay means in circuit relation with said detecting means for producing timing pulses at intervals of time integrally related to the period of said sequential detecting means, and means responsive to said detecting means and said timing pulses for producing sampling pulses intelligibly related to said data.

12. A data system with a main data bus, containing a plurality of input lines, comprising a corresponding plurality of bridging lines connected to said input lines, a plurality of receivers connected individually to said bridging lines, a plurality of sampling lines individually connected to said receivers, a plurality of delay networks individually connected to groups of said receivers supplied with the same code format, addressing means for individually and sequentially enabling said receivers, and means for utilizing the outputs of said delay networks for producing data sampling pulses.

References Cited

UNITED STATES PATENTS 3,229,259 1/1966 Barker et al. __________ 179—15

JOHN W. CALDWELL, *Acting Primary Examiner.*

J. T. STRATMAN, *Assistant Examiner.*